US009178411B2

(12) United States Patent
Djenguerian et al.

(10) Patent No.: US 9,178,411 B2
(45) Date of Patent: Nov. 3, 2015

(54) CHARGING CIRCUIT FOR A POWER CONVERTER CONTROLLER

(71) Applicant: Power Integrations, Inc., San Jose, CA (US)

(72) Inventors: Alex B. Djenguerian, Saratoga, CA (US); David Kung, Foster City, CA (US); Sheng Liu, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 397 days.

(21) Appl. No.: 13/746,777

(22) Filed: Jan. 22, 2013

(65) Prior Publication Data

US 2014/0204623 A1 Jul. 24, 2014

(51) Int. Cl.
*H02M 3/335* (2006.01)
*H02M 1/36* (2007.01)
*H02M 1/00* (2007.01)

(52) U.S. Cl.
CPC ............ *H02M 1/36* (2013.01); *H02M 3/33523* (2013.01); *H02M 3/33592* (2013.01); *H02M 2001/0006* (2013.01); *Y02B 70/1475* (2013.01)

(58) Field of Classification Search
USPC ......... 363/15, 16, 21.04, 21.06, 21.07, 21.12, 363/21.14, 21.15, 97, 147
See application file for complete search history.

(56) References Cited

U.S. PATENT DOCUMENTS

| | | | |
|---|---|---|---|
| 5,162,970 A | 11/1992 | Davis, Jr. et al. | |
| 5,650,357 A | 7/1997 | Dobkin et al. | |
| 6,373,727 B1 * | 4/2002 | Hedenskog et al. | 363/21.14 |
| 6,384,478 B1 | 5/2002 | Pour | |
| 6,456,511 B1 * | 9/2002 | Wong | 363/21.13 |
| 6,998,952 B2 | 2/2006 | Zhou et al. | |
| 7,259,614 B1 * | 8/2007 | Baker et al. | 327/538 |
| 7,468,547 B2 | 12/2008 | Harvey | |
| 7,524,731 B2 | 4/2009 | Wang | |
| 7,619,297 B2 | 11/2009 | Wang | |
| 7,868,431 B2 | 1/2011 | Feng et al. | |
| 7,884,696 B2 | 2/2011 | Hébert et al. | |
| 8,093,983 B2 | 1/2012 | Fouquet et al. | |
| 8,772,909 B1 | 7/2014 | Vinciarelli | |
| 2004/0214376 A1 | 10/2004 | Gibson et al. | |
| 2005/0271148 A1 | 12/2005 | Dupuis | |
| 2009/0268487 A1 * | 10/2009 | Park | 363/21.12 |

(Continued)

FOREIGN PATENT DOCUMENTS

JP H09260569 A 10/1997

*Primary Examiner* — Adolf Berhane
*Assistant Examiner* — Alex Torres-Rivera
(74) *Attorney, Agent, or Firm* — Blakely Sokoloff Taylor & Zafman LLP

(57) ABSTRACT

A controller includes a first controller terminal, a second controller terminal, a first p-channel metal-oxide-semiconductor field-effect transistor, and a second pMOS transistor. The first controller terminal is to be coupled to a bypass capacitor coupled to a secondary side of an isolated power converter. The second controller terminal to be coupled to an output node of the secondary side. The first pMOS transistor includes a first source terminal coupled to the second controller terminal, a first drain terminal, and a first body diode. The second pMOS transistor includes a second source terminal coupled to the first controller terminal, a second drain terminal coupled to the first drain terminal, and a second body diode. A cathode of the second body diode is coupled to the second source terminal. An anode of the second body diode is coupled to the second drain terminal.

9 Claims, 7 Drawing Sheets

(56) References Cited

U.S. PATENT DOCUMENTS

| | | | |
|---|---|---|---|
| 2011/0085357 A1* | 4/2011 | Polivka et al. | 363/21.12 |
| 2011/0194315 A1* | 8/2011 | Gaknoki et al. | 363/21.17 |
| 2011/0305043 A1* | 12/2011 | Matsumoto | 363/21.01 |

* cited by examiner

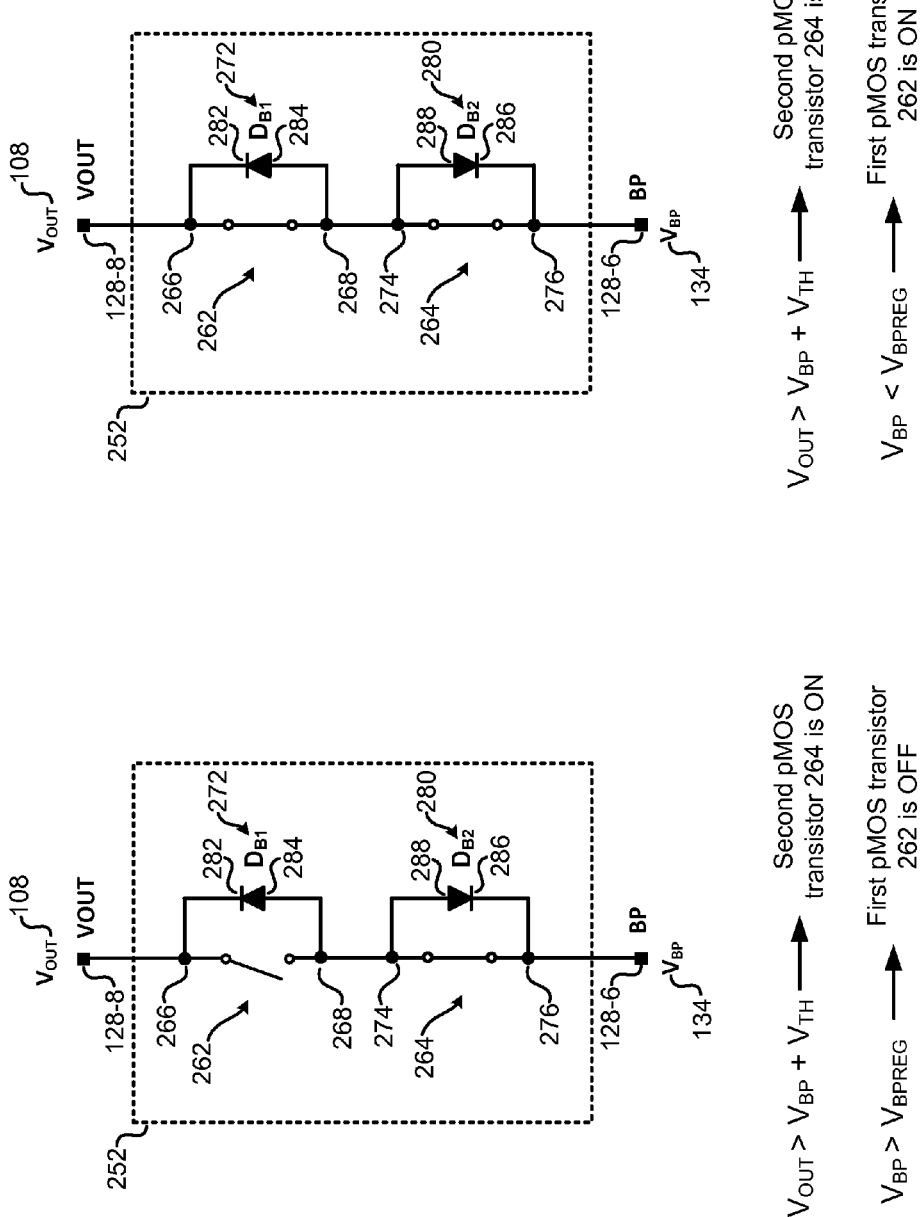

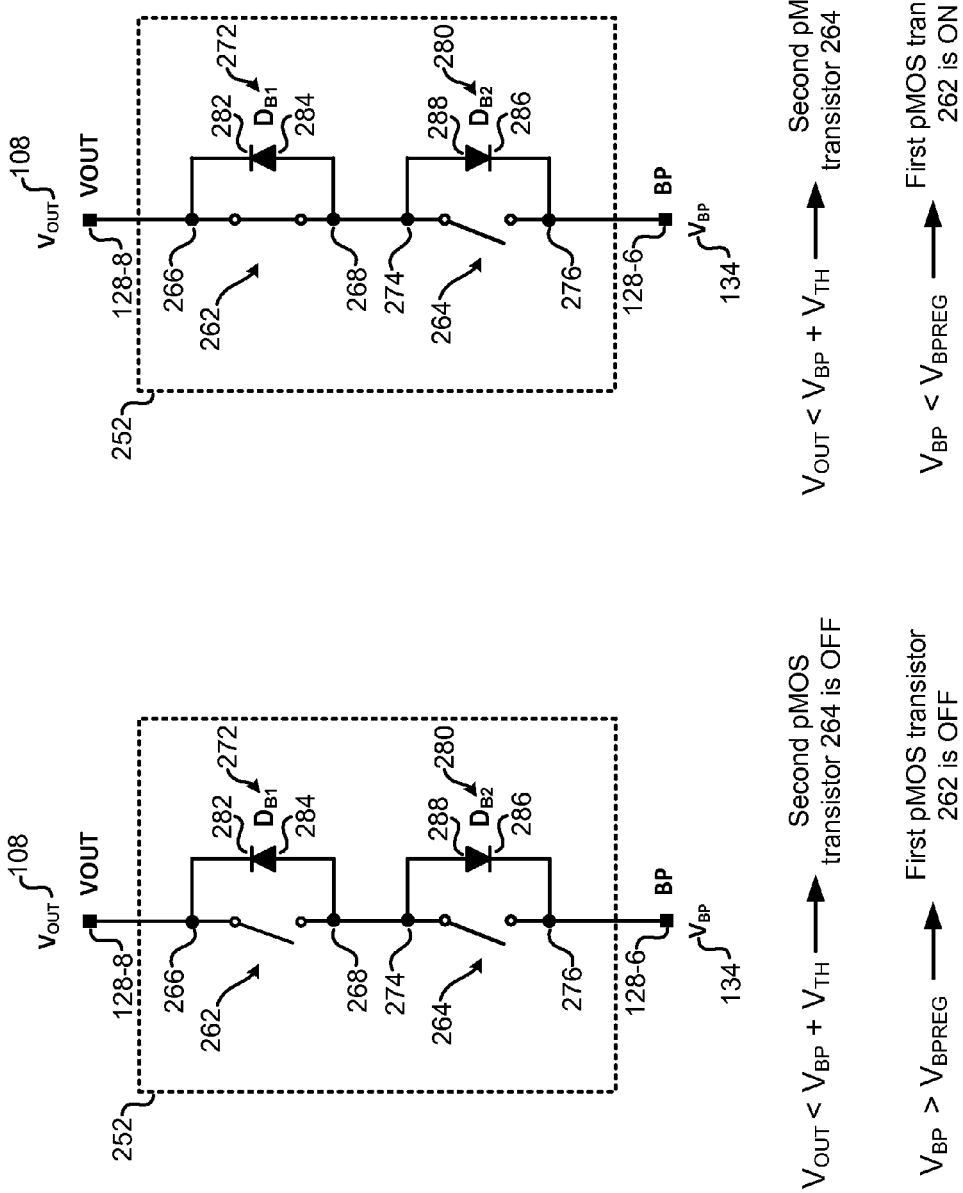

CHARGING CIRCUIT FOR A POWER CONVERTER CONTROLLER

BACKGROUND INFORMATION

1. Field of the Disclosure

The disclosure relates to power converters, and more particularly, to control circuits for isolated power converters.

2. Background

Switch mode power converters are widely used in household or industrial appliances for converting a low frequency (e.g., 50 Hz or 60 Hz) high voltage alternating current (ac) input voltage to a required level of direct current (dc) output voltage. For example, switch mode power converters may be included in commonly used electronic devices, such as battery chargers for mobile electronic devices. Various types of switch mode power converters are popular because of their well regulated output, high efficiency, and small size along with their safety and protection features. Popular topologies of switch mode power converters include flyback, forward, boost, buck, half bridge, and full bridge, among many others including resonant types.

Switch mode power converters may include an energy transfer element, a power switch, and control circuits that operate to regulate the value of the power converter output voltage. The energy transfer element (e.g., a coupled inductor) may include a primary winding and a secondary winding that are galvanically isolated from one another. The primary winding may be coupled to circuits on the input side of the power converter, such as the power switch. The secondary winding may be coupled to circuits on the output side of the power converter that deliver the regulated output voltage to the electrical load.

The power switch (e.g., a high voltage power switch) may be coupled to the primary winding of the energy transfer element to control current through the primary winding. The control circuits of the power converter may sense the output voltage and control the state of the power switch to control the transfer of energy from the primary winding to the secondary winding in response to the sensed output voltage. Some of the control circuits (e.g., logic circuits) may operate at a relatively low voltage (e.g., at less than 5 V). Accordingly, the control circuits may also include components that regulate the operating voltage of the control circuits at a relatively low voltage.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

FIGS. 4A-4D are schematic diagrams showing different states of an example charge transfer circuit according to the present disclosure.

Figure 1:
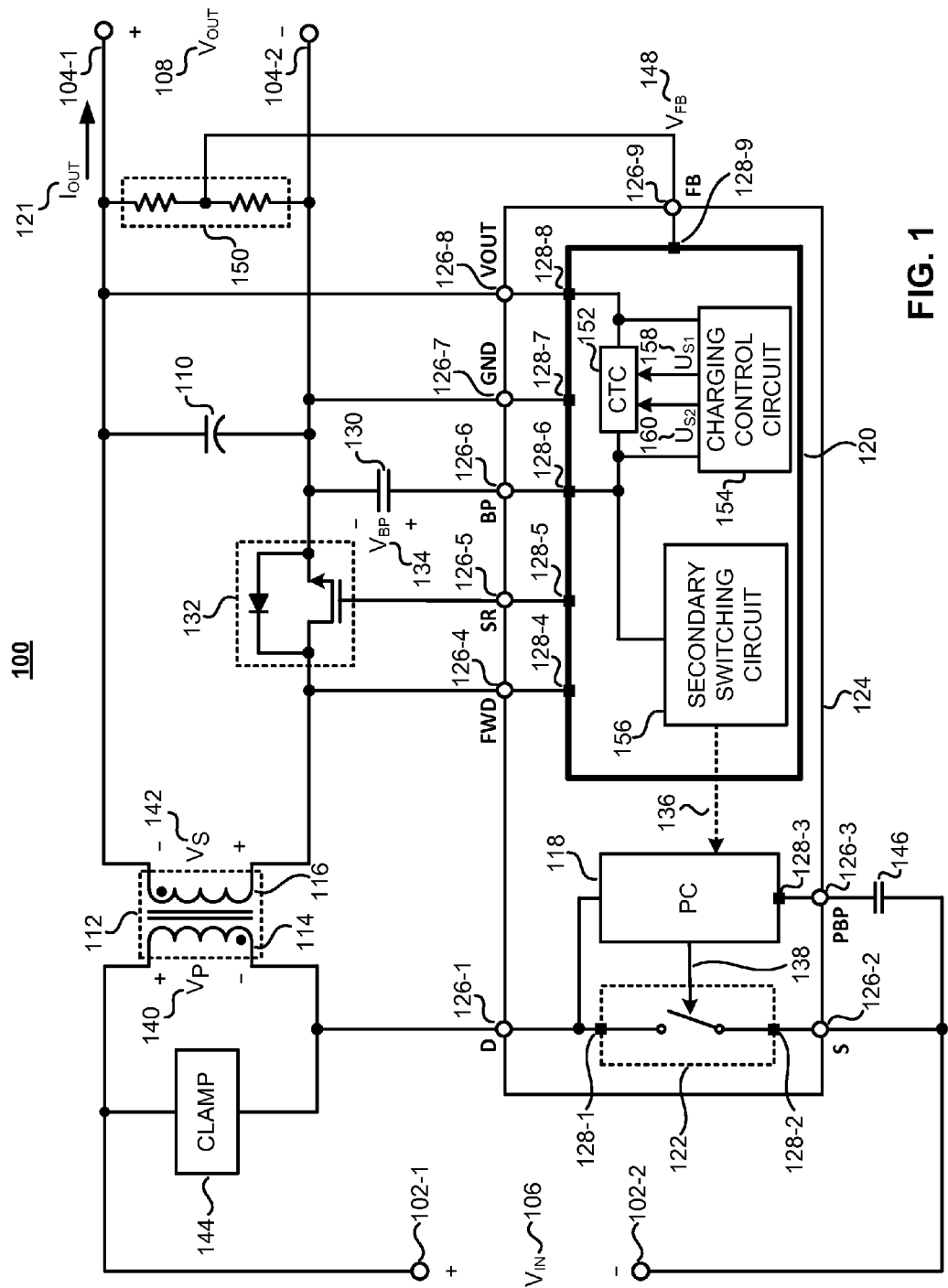
FIG. 1 is a schematic diagram of an example isolated power converter including a primary controller, a secondary controller, and a power switch according to the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in commercially feasible embodiments are often not depicted in order to facilitate a less obstructed view of the various embodiments of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures, or characteristics may be combined in any suitable combinations and/or subcombinations in one or more embodiments or examples. Particular features, structures, or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

An isolated power converter according to the present disclosure includes a primary controller and a secondary controller that are galvanically isolated from one another by an energy transfer element (e.g., a coupled inductor). In other words, a dc voltage applied between the input side of the isolated power converter and the output side of the isolated power converter will produce substantially zero current.

The primary controller is coupled to control a power switch on the primary side of the isolated power converter to control the transfer of energy from the primary winding of the energy transfer element to the secondary winding of the energy transfer element. The secondary controller is coupled to circuit components on the secondary side of the isolated power converter. Although the primary controller and the secondary controller are galvanically isolated from one another, the secondary controller may transmit a signal to the primary controller that controls how the primary controller switches the power switch to transfer energy to the secondary side.

The secondary side of the isolated power converter includes a bypass capacitor that provides operating power to circuits of the secondary controller. The secondary controller of the present disclosure may control charging of the bypass capacitor to regulate the voltage across the bypass capacitor at a sufficient level to operate circuits of the secondary controller. As described hereinafter, the secondary controller may include a charge transfer circuit and a charging control circuit that regulate the voltage across the bypass capacitor.

The charge transfer circuit of the secondary controller may include a terminal that is coupled to the bypass capacitor. The terminal of the charge transfer circuit coupled to the bypass capacitor may be referred to herein as a "bypass terminal." The voltage developed across the bypass capacitor, which may be sensed at the bypass terminal, may be referred to herein to as the "bypass voltage $V_{BP}$."

The charge transfer circuit may also include a terminal that is connected to an output node of the secondary side that provides a regulated output voltage to a load. The terminal of the charge transfer circuit that may be coupled to the output node may be referred to herein as an "output voltage terminal." The voltage developed at the output node of the secondary side with respect to an output return, which may be sensed at the output voltage terminal, may be referred to herein as an "output voltage $V_{OUT}$."

The charge transfer circuit may be set in an enabled state or a disabled state by the charging control circuit. When the charge transfer circuit is in the enabled state, the charge transfer circuit may transfer charge from the output voltage terminal to the bypass terminal for storage on the bypass capacitor. As described herein, the voltage drop across the charge transfer circuit (e.g., the bypass voltage $V_{BP}$ minus the output voltage $V_{OUT}$) may be relatively low (e.g., 0.2-0.4 V) when the charge transfer circuit is in the enabled state. When the charge transfer circuit is in the disabled state, the charge transfer circuit may disconnect the output voltage terminal from the bypass terminal so that charge is not transferred from the output voltage terminal to the bypass terminal. As described herein, the charge transfer circuit may include components (e.g., body diodes) that prevent the discharge of the bypass capacitor to the output voltage terminal when the charge transfer circuit is disabled.

In general, the charging control circuit may control (e.g., enable/disable) the charge transfer circuit to maintain the bypass voltage $V_{BP}$ at a bypass regulation voltage value $V_{BPREG}$. The bypass regulation voltage value $V_{BPREG}$ may be a desired value of the bypass voltage $V_{BP}$, e.g., that is sufficient to operate circuits of secondary controller. The charging control circuit may enable the charge transfer circuit to charge the bypass capacitor to the bypass regulation voltage value $V_{BPREG}$ when the bypass voltage $V_{BP}$ is less than the bypass regulation voltage value $V_{BPREG}$ and the output voltage $V_{OUT}$ is at a sufficient level to charge the bypass capacitor. Alternatively, the charging control circuit may disable the charge transfer circuit when the bypass voltage $V_{BP}$ is greater than or equal to the bypass regulation voltage value $V_{BPREG}$ and/or the output voltage $V_{OUT}$ is at an insufficient level to charge the bypass capacitor.

An example charge transfer circuit of the present disclosure may include a first p-channel metal-oxide-semiconductor field-effect transistor (pMOS transistor) and a second pMOS transistor coupled in series between the output voltage terminal and the bypass terminal. For example, the first and second pMOS transistors may be coupled between the output voltage terminal and the bypass terminal such that charge may be transferred from the output voltage terminal to the bypass terminal through the first and second pMOS transistors when the first and second pMOS transistors are both in an ON state (e.g., closed switches). Charge transfer between the output voltage terminal and the bypass terminal may be blocked when the first pMOS transistor and/or the second pMOS transistor is in an OFF state (e.g., an open switch).

The first pMOS transistor includes a first source terminal, a first drain terminal, a first gate terminal, and a first body diode. The second pMOS transistor includes a second source terminal, a second drain terminal, a second gate terminal, and a second body diode. The first source terminal of the first pMOS transistor may be coupled to the output voltage terminal. The first drain terminal may be coupled to the second drain terminal of the second pMOS transistor. The second source terminal may be coupled to the bypass terminal.

The first body diode is coupled between the first source terminal and the first drain terminal. The cathode of the first body diode is coupled to the first source terminal. The anode of the first body diode is coupled to the first drain terminal. The second body diode is coupled between the second source terminal and the second drain terminal. The cathode of the second body diode is coupled to the second source terminal. The anode of the second body diode is coupled to the second drain terminal.

The charging control circuit is coupled to the first and second gate terminals to control the state of first and second pMOS transistors, respectively. The charging control circuit may also be coupled to the bypass terminal and the output voltage terminal to sense the bypass voltage $V_{BP}$ and the output voltage $V_{OUT}$. The control circuit may set both the first and second pMOS transistors in the ON state to enable the charge transfer circuit to charge the bypass capacitor. The control circuit may set at least one of the first and second pMOS transistors in the OFF state to disable the charge transfer circuit and prevent charging of the bypass capacitor.

The charging control circuit may set the states of the first and second pMOS transistors in response to the sensed bypass voltage $V_{BP}$ and sensed output voltage $V_{OUT}$. For example, the charging control circuit may set the first and second pMOS transistors in the ON state to charge the bypass capacitor when the output voltage $V_{OUT}$ is at a sufficient level to charge the bypass capacitor and the bypass voltage $V_{BP}$ is less than the bypass regulation voltage value $V_{BPREG}$. When the first and second pMOS transistors are in the ON state, the voltage drop across each of the first and second pMOS transistors may be approximately 0.1-0.2 V. Accordingly, in some examples, a voltage drop across the series connection of the first and second pMOS transistors (e.g., $V_{OUT}$-$V_{BP}$) may be approximately 0.2-0.4 V. In these examples, the bypass capacitor may be charged and/or regulated to a bypass voltage $V_{BP}$ of approximately 0.2-0.4 V less than the output voltage $V_{OUT}$ of the isolated power converter.

The charging control circuit may set the first pMOS transistor and/or the second pMOS transistor in the OFF state to prevent charging of the bypass capacitor. In one example, the charging control circuit may set the first pMOS transistor in the OFF state when the bypass voltage $V_{BP}$ is greater than or equal to the bypass regulation voltage value $V_{BPREG}$ to prevent excessive charging of the bypass voltage $V_{BP}$ beyond the bypass regulation voltage value $V_{BPREG}$. The orientation of the first body diode may prevent the conduction of current from the output voltage terminal to the bypass terminal when the first pMOS transistor is in the OFF state.

The charging control circuit may set the second pMOS transistor in the OFF state when the output voltage $V_{OUT}$ is at an insufficient level to charge the bypass capacitor. For example, the charging control circuit may set the second pMOS transistor in the OFF state when the output voltage $V_{OUT}$ is not greater than the bypass voltage $V_{BP}$ by a threshold voltage value ($V_{TH}$). The orientation of the second body diode may prevent current conduction from the bypass terminal to the output voltage terminal when the second pMOS transistor is in the OFF state. Put another way, the orientation of the second body diode may prevent discharging of the bypass capacitor to the output voltage terminal when the second pMOS transistor is in the OFF state.

As described herein, the charge transfer circuit of the present disclosure may present a low voltage drop during bypass capacitor charging. For example, the voltage drop across the first and second pMOS transistors of the charge transfer circuit be approximately 0.2-0.4 V during charging of the bypass capacitor. The low voltage drop across the charge transfer circuit may allow the bypass voltage $V_{BP}$ to be maintained at a value that is near (e.g., within 0.2-0.4 V) the output voltage $V_{OUT}$. Some circuits of the secondary controller may benefit from such a high voltage regulation point, such as the communication link of FIG. 6. Additionally, in some examples, the low voltage drop of the charge transfer circuit of the present disclosure may allow the bypass voltage $V_{BP}$ to be reliably maintained above the bypass regulation voltage value $V_{BPREG}$ in circumstances when the output voltage $V_{OUT}$ drops to a value that is near (e.g., approximately 0.2-0.4 V) the bypass regulation voltage value $V_{BPREG}$.

Additionally, the charge transfer circuit may prevent discharging of the bypass capacitor in some circumstances. For example, as described herein, the second pMOS transistor may include a second body diode that prevents discharging of the bypass capacitor to the output of the isolated power converter in circumstances when the output voltage $V_{OUT}$ drops to a value that is less than the bypass voltage $V_{BP}$. Although a passive element, such as a diode external to a pMOS transistor, could be used to prevent discharging of the bypass capacitor in some circuit implementations, the use of such a diode would present a forward voltage drop that may be greater than that provided by the series pMOS transistor configuration of the charge transfer circuit described herein.

Figure 2:
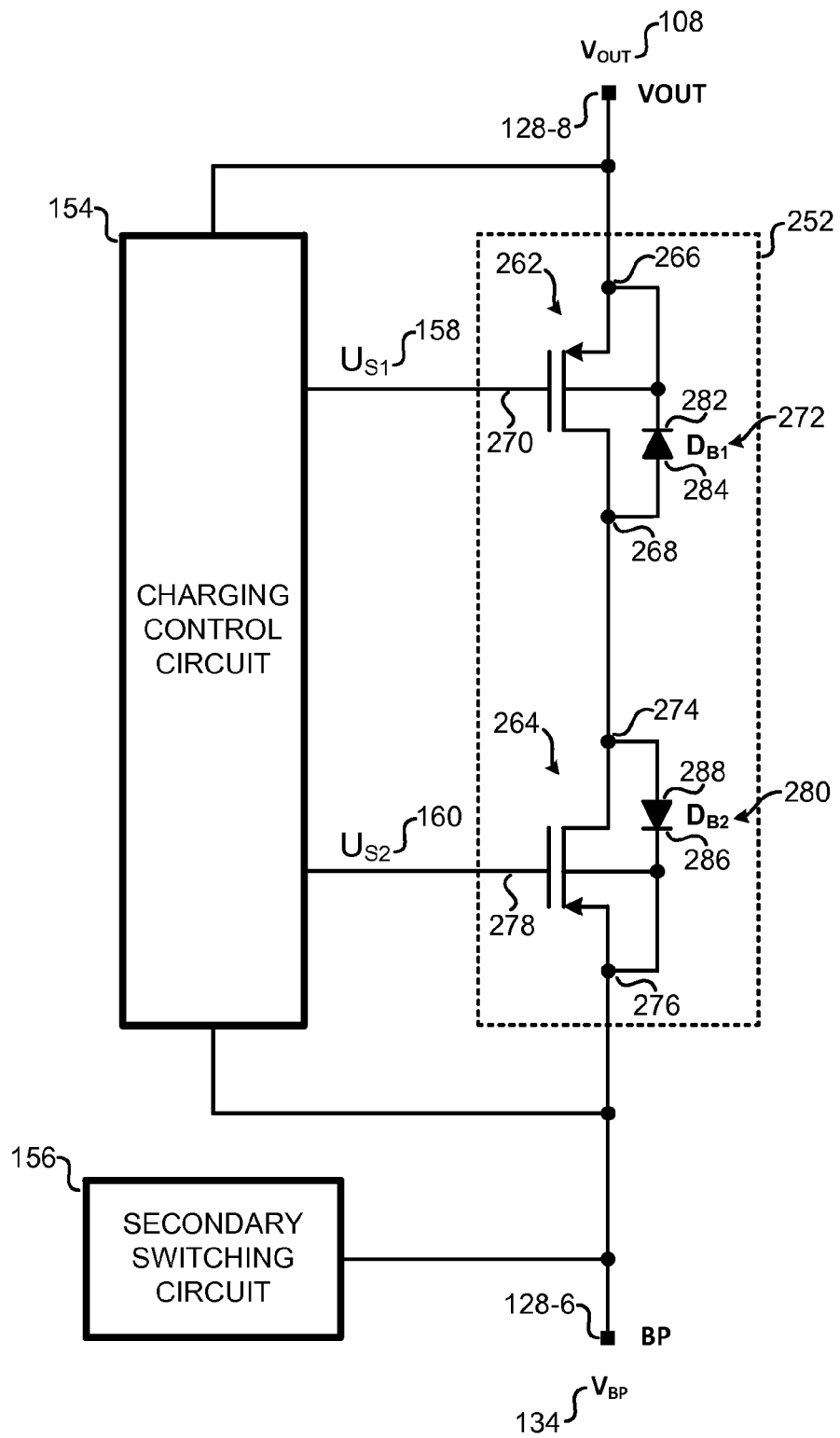
FIG. 2 is a schematic diagram of an example charge transfer circuit of the secondary controller according to the present disclosure.
Figure 3:
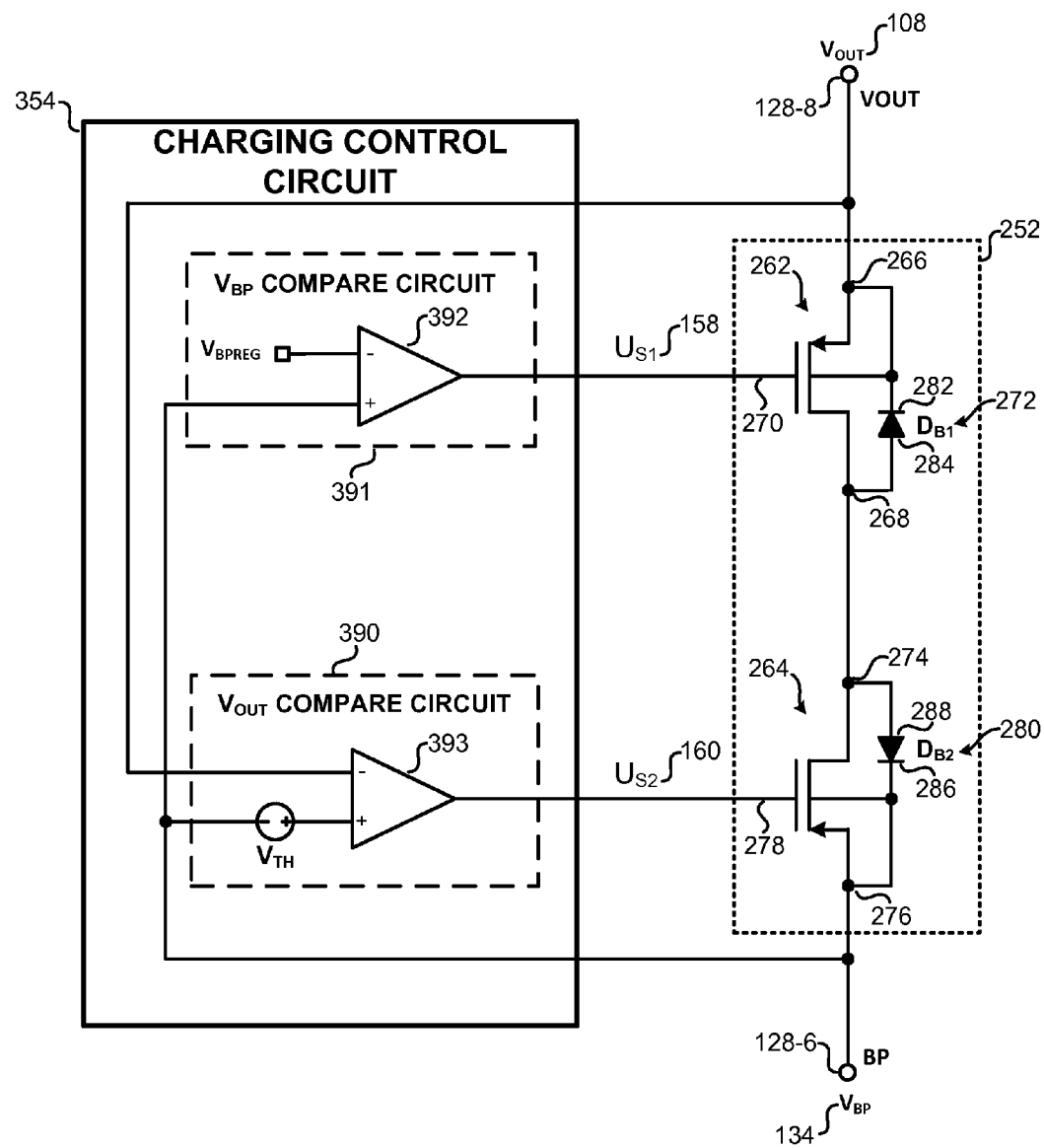
FIG. 3 is a schematic diagram of an example charging control circuit of the secondary controller according to the present disclosure.
Figure 5:
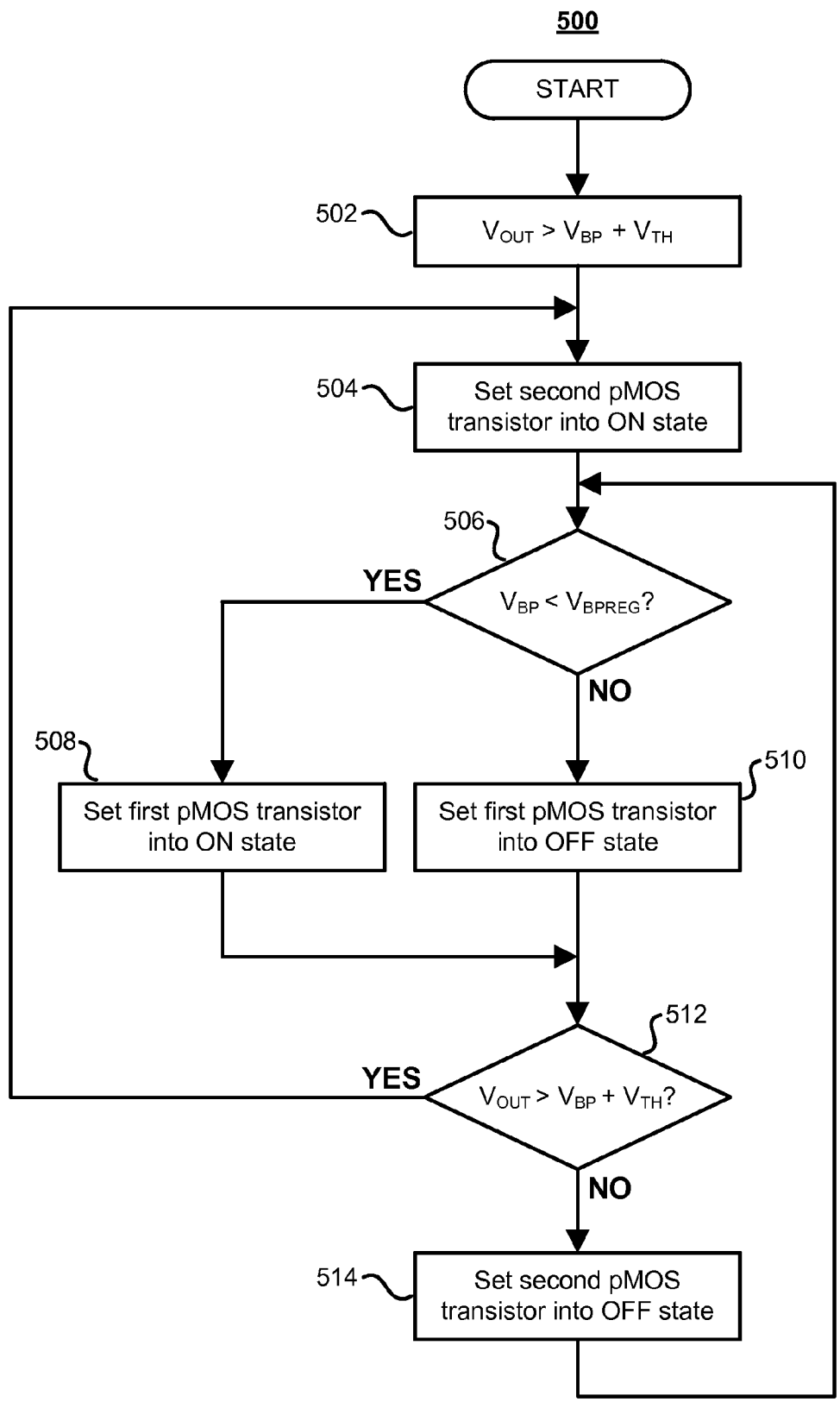
FIG. 5 is a flow diagram of an example method for controlling an isolated power converter according to the present disclosure.
Figure 6:
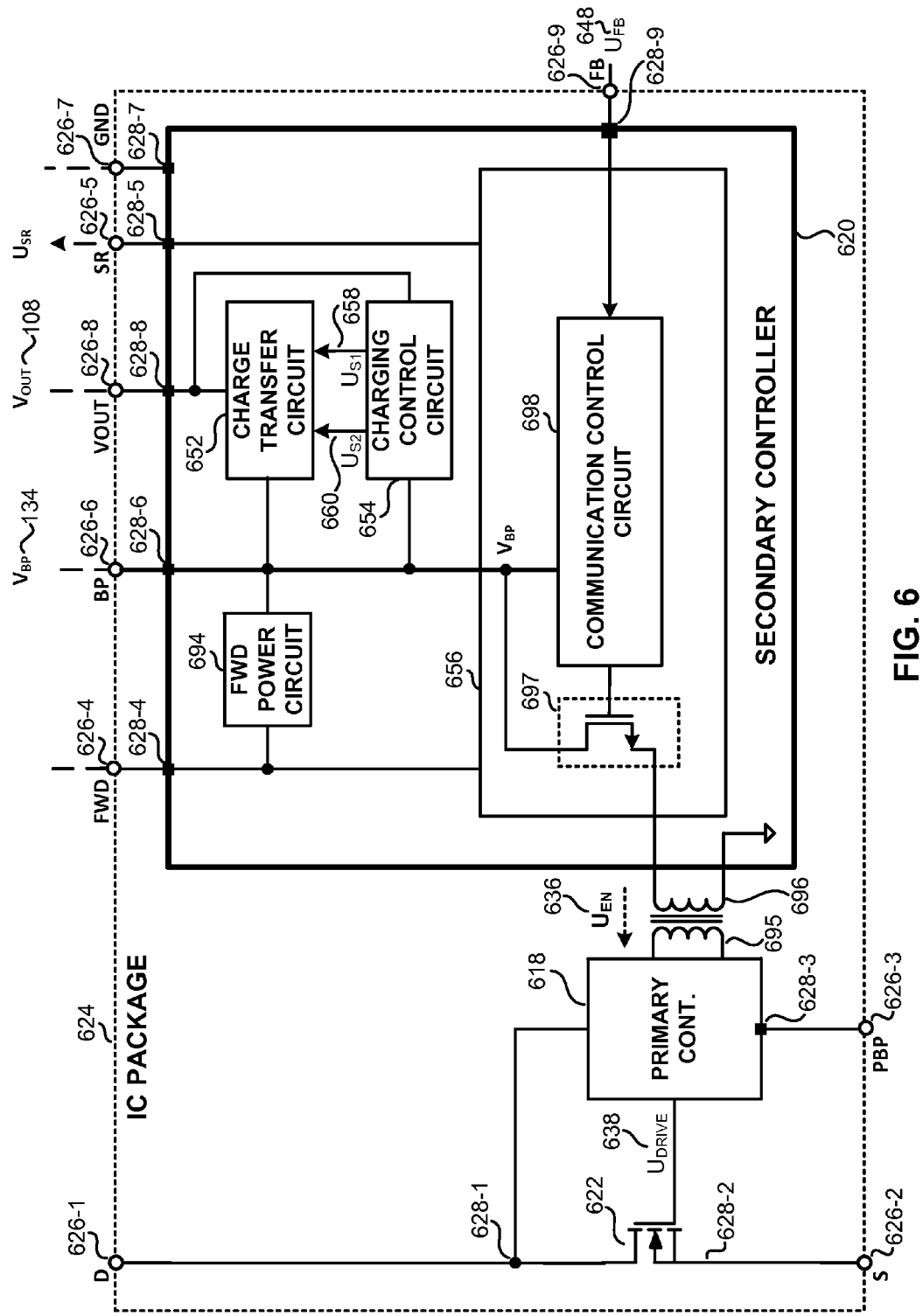
FIG. 6 is a functional block diagram of an example integrated circuit package that includes a magnetically coupled communication link according to the present disclosure.

An example isolated power converter according to the present disclosure is now described with reference to FIGS. 1-6. FIG. 1 shows an example isolated power converter that includes a secondary controller having a charging control circuit and a charge transfer circuit. FIG. 2 illustrates an example charge transfer circuit including first and second pMOS transistors. FIG. 3 shows an example charging control circuit that controls the state of the first and second pMOS transistors of FIG. 2. FIGS. 4A-4D show the first and second pMOS transistors in a variety of different states. FIG. 5 shows a method for operating a power converter including the charging control circuit and the charge transfer circuit of the present disclosure. FIG. 6 shows an example magnetically coupled communication link that may be driven by the bypass voltage $V_{BP}$ developed across the bypass capacitor using the charge transfer circuit of the present disclosure.

FIG. 1 is a schematic diagram of an example power converter 100 according to the present disclosure. Example power converter 100 is an isolated switch mode power converter having a flyback topology. Power converter 100 includes input terminals 102-1, 102-2 (collectively "input terminals 102") and output terminals 104-1, 104-2 (collectively "output terminals 104"). Input terminals 102 are coupled to receive an input voltage $V_{IN}$ 106, which may be a rectified and filtered ac voltage. For example, input terminals 102 may be coupled to a full-bridge rectifier (not shown) and a filter capacitance (not shown) that are coupled to rectify and filter an ac voltage received from an ac voltage source. In one example, input voltage $V_{IN}$ 106 may be a time-varying dc voltage. As shown, $V_{IN}$ 106 is referenced to input terminal 102-2, which may be referred to as "input return 102-2."

Output terminals 104 provide an output voltage $V_{OUT}$ 108 to an electrical load (not shown). After startup of power converter 100, power converter 100 may regulate the value of output voltage $V_{OUT}$ 108 to a desired regulated output voltage value (e.g., 5-12 V dc). Startup may be a period of time starting from when power converter 100 is introduced to $V_{IN}$ 106 until the control circuits of power converter 100 begin operating to regulate the output voltage $V_{OUT}$ 108 of power converter 100. Accordingly, output voltage $V_{OUT}$ 108 may be referred to as a "regulated output voltage." Output terminals 104 are coupled to an output capacitor 110 to smooth out regulated output voltage $V_{OUT}$ 108. As shown, output voltage $V_{OUT}$ 108 is referenced to output terminal 104-2, which may be referred to as "output return 104-2." In one example, output capacitor 110 may have a capacitance value in the range of approximately 200-600 µF.

Power converter 100 includes an energy transfer element 112. Energy transfer element 112 includes a primary winding 114 and a secondary winding 116. Energy transfer element 112 is coupled to transfer electrical energy from primary winding 114 to secondary winding 116. In one example, energy transfer element 112 may be a coupled inductor. Circuits that are electrically coupled between input terminals 102 and primary winding 114 may be referred to as the "primary side" of power converter 100. Circuits that are electrically coupled between secondary winding 116 and output terminals 104 may be referred to as the "secondary side" of power converter 100. Energy transfer element 112 provides galvanic isolation between circuits on the primary side of power converter 100 and circuits on the secondary side of power converter 100. Accordingly, a dc voltage applied between the primary side and the secondary side of power converter 100 will produce substantially zero current.

Power converter 100 includes a primary side control circuit 118 (hereinafter "primary controller 118"), a secondary side control circuit 120 (hereinafter "secondary controller 120"), and a power switch 122. Primary controller 118, secondary controller 120, and power switch 122 are included in an integrated circuit package 124, which is illustrated as a box in FIG. 1.

In one example, integrated circuit package 124 may include a first integrated circuit die and a second integrated circuit die within an encapsulation. An encapsulation may refer to an encasing or molding that surrounds or encloses one or more integrated circuit dice and a portion of a lead frame. The first integrated circuit die may include primary controller 118 and power switch 122. The second integrated circuit die may include secondary controller 120. In another example, integrated circuit package 124 may include three integrated circuit dice within an encapsulation. For example, integrated circuit package 124 may include a first integrated circuit die that includes power switch 122, a second integrated circuit die that includes primary controller 118, and a third integrated circuit die that includes secondary controller 120.

The integrated circuit dice including primary controller 118 and secondary controller 120 are galvanically isolated from one another. Accordingly, secondary controller 120 is galvanically isolated from primary controller 118 and power switch 122. Although primary controller 118 and secondary controller 120 are galvanically isolated from one another, primary controller 118 and secondary controller 120 may communicate with one another. In one example, secondary controller 120 may communicate with primary controller 118 through a magnetically coupled communication link formed by isolated conductors of the lead frame of integrated circuit package 124. For example, the communication link between primary controller 118 and secondary controller 120 may be implemented using galvanically isolated conductive loops included in the lead frame of integrated circuit package 124. Communication via a magnetically coupled communication link is described herein with reference to FIG. 6. In another example, secondary controller 120 may communicate with primary controller 118 through an optically coupled communication link.

Although primary controller 118, secondary controller 120, and power switch 122 are illustrated as included in a single integrated circuit package, in other examples, one or more of primary controller 118, secondary controller 120, and power switch 122 may be located outside of the illustrated integrated circuit package. For example, power switch 122 may be included in an integrated circuit package that is separate from another integrated circuit package that includes both primary controller 118 and secondary controller 120.

Circuits external to integrated circuit package 124 may electrically couple to package terminals D 126-1, S 126-2, PBP 126-3, FWD 126-4, SR 126-5, BP 126-6, GND 126-7, VOUT 126-8, and FB 126-9 (collectively "package terminals 126") of integrated circuit package 124. Package terminals 126 of integrated circuit package 124 may include conductive pins and/or conductive pads for connection to circuits external to integrated circuit package 124.

Package terminals 126 may connect to terminals (e.g., on integrated circuit die) of power switch 122, primary controller 118, and secondary controller 120 included inside encapsulation of integrated circuit package 124. Power switch 122 includes terminals D 128-1 and S 128-2. Primary controller 118 includes terminal PBP 128-3. Secondary controller 120 includes terminals FWD 128-4, SR 128-5, BP 128-6, GND 128-7, VOUT 128-8, and FB 128-9. Terminals D 128-1, S 128-2, PBP 128-3, FWD 128-4, SR 128-5, BP 128-6, GND 128-7, VOUT 128-8, and FB 128-9 may be conductive connections included on the integrated circuit die that include power switch 122, primary controller 118, and secondary controller 120. GND terminal 128-7 is coupled to output terminal 104-2. In one example, GND terminal 128-7 may be the output return for secondary controller 120.

As shown, primary controller 118 is coupled to circuit components of the primary side of power converter 100, such as power switch 122. Secondary controller 120 is coupled to circuit components of the secondary side of power converter 100. For example, secondary controller 120 is coupled to secondary winding 116, output terminals 104, a bypass capacitor 130, a synchronous rectification circuit 132, along with other circuit components. Primary controller 118 and secondary controller 120 control circuits of power converter 100 (e.g., power switch 122 and synchronous rectification circuit 132) to control energy transfer from input terminals 102 to output terminals 104.

In operation, secondary controller 120 of the present disclosure receives power from the secondary side of power converter 100. For example, secondary controller 120 may receive power from bypass capacitor 130 which is coupled to secondary controller 120 at bypass terminal BP 128-6. Secondary controller 120 includes circuits that control charging of bypass capacitor 130 and regulation of bypass voltage $V_{BP}$ 134 across bypass capacitor 130. In one example, bypass capacitor 130 may have a capacitance value in the range of approximately 1-2 μF.

Although primary controller 118 and secondary controller 120 are galvanically isolated from one another, secondary controller 120 may transmit an enable signal 136 to primary controller 118. For example, secondary controller 120 may transmit enable signal 136 via galvanically isolated conductive loops included in the lead frame of integrated circuit package 124. Primary controller 118 may control the state of power switch 122 in response to enable signal 136 received from secondary controller 120. Transmission of an enable signal via galvanically isolated conductive loops is described herein with reference to FIG. 6.

Power switch 122 may be a high voltage power switch, which may have a breakdown voltage in the range of 700-800 V. In one example, power switch 122 may be a power metal-oxide-semiconductor field-effect transistor (power MOSFET), as illustrated in FIG. 6. Power switch 122 is coupled to primary winding 114 and input return 102-2. In examples where power switch 122 is a power MOSFET, the drain of the power MOSFET may be coupled to drain terminal D 128-1 (i.e., primary winding 114) and the source of the power MOSFET may be coupled to source terminal S 128-2 (i.e., input return 102-2), as illustrated in FIG. 6.

In operation, primary controller 118 controls current through power switch 122 and primary winding 114. In general, power switch 122 may be in an "ON" state (e.g., a closed switch) or an "OFF" state (e.g., an open switch), in response to a switch drive signal 138 generated by primary controller 118. When power switch 122 is in the ON state (e.g., a closed switch), power switch 122 may conduct current. When power switch 122 is in the OFF state (e.g., an open switch), power switch 122 may not conduct current when a voltage is applied across power switch 122.

When power switch 122 is in the ON state, current through primary winding 114 increases, storing energy in energy transfer element 112. Additionally, a primary winding voltage $V_P$ 140 with a first polarity develops across primary winding 114 while power switch 122 is in the ON state. A secondary winding voltage $V_S$ 142 of opposite polarity with respect to primary winding voltage $V_P$ 140 develops across secondary winding 116 while power switch 122 is in the ON state. Clamp circuit 144 is coupled to input winding 114 of energy transfer element 112 to limit the maximum voltage on power switch 122 when power switch 122 transitions between an ON state and an OFF state.

When power switch 122 is in the OFF state, power switch 122 may act as an open circuit and substantially prevent current through power switch 122. When power switch 122 transitions from the ON state to the OFF state, secondary winding voltage $V_S$ 142 allows for energy to be transferred to output capacitor 110, which provides power to an electrical load connected to output terminals 104. In one example, secondary controller 120 may control synchronous rectification circuit 132 to act as a closed switch when power switch 122 transitions form the ON state to the OFF state so that output capacitor 110 is efficiently charged. For example, the transistor of synchronous rectification circuit 132 may act as a closed switch having a low on-resistance during charging of output capacitor 110 so that the voltage drop across synchronous rectification circuit 132 is low. The low voltage drop across synchronous rectification circuit 132 during charging of output capacitor 110 may provide an increase in efficiency relative to other converter topologies that include a passive component (e.g., a diode) in place of synchronous rectification circuit 132. Although power converter 100 includes synchronous rectification circuit 132, in some examples, power converter 100 may include a passive rectification component, such as a diode, instead of synchronous rectification circuit 132.

Primary controller 118 is coupled to power switch 122 to control the state of power switch 122. Primary controller 118 generates switch drive signal 138 that drives power switch 122 in response to enable signal 136. In an example where power switch 122 is a power MOSFET, primary controller 118 may be coupled to the gate of the power MOSFET, as illustrated in FIG. 6. In this example, primary controller 118 may apply a gate-to-source voltage that is greater than the threshold voltage of the power MOSFET to put the power MOSFET in the ON state. Primary controller 118 may apply a gate-to-source voltage that is less than the threshold voltage of the power MOSFET to put the power MOSFET in the OFF state.

In operation, primary controller 118 receives operating power from input terminals 102 and/or primary bypass capacitor 146. Primary bypass capacitor 146 may store energy received from input terminals 102 when input voltage $V_{IN}$ 106 is provided at input terminals 102. Energy stored on primary bypass capacitor 146 may be used as operating power by primary controller 118, e.g., to generate switch drive signal 138 in response to enable signal 136 received from secondary controller 120. In one example, primary bypass capacitor 146 may be charged when power switch 122 is in an OFF state.

Secondary controller 120 transmits enable signal 138 to primary controller 118 to indicate to primary controller 118 how to switch power switch 122. Specifically, primary controller 118 generates switch drive signal 138 that controls the state of power switch 122 in response to enable signal 136 received from secondary controller 120. Secondary controller 120 may generate enable signal 136 in response to a sensed output (e.g., current and/or voltage) of power converter 100. For example, secondary controller 120 of FIG. 1 senses feedback voltage $V_{FB}$ 148 at feedback terminal FB 128-9 (e.g., with respect to GND terminal 128-7) and generates enable signal 136 in response to feedback voltage $V_{FB}$ 148. In one example, feedback voltage $V_{FB}$ 148 sensed at feedback terminal FB 128-9 is a scaled down voltage, scaled by resistor divider circuit 150, that is representative of output voltage $V_{OUT}$ 108 of power converter 100. Although example secondary controller 120 of FIG. 1 generates enable signal 136 in response to a sensed output voltage $V_{OUT}$ 108 of power converter 100, it is contemplated that, in some examples, secondary controller 120 may generate an enable signal in response to other sensed parameters, such as the output current $I_{OUT}$ 121 and/or a combination of output voltage $V_{OUT}$ 108 and output current $I_{OUT}$ 121 of power converter 100.

In operation, secondary controller 120 is coupled to transmit enable signal 136 to primary controller 118 to regulate output voltage $V_{OUT}$ 108 at a regulated output voltage value in response to a sensed feedback voltage $V_{FB}$ 148. If secondary controller 120 senses that output voltage $V_{OUT}$ 108 has dropped to a value that is less than a regulated output voltage value in response to feedback voltage $V_{FB}$ 148, secondary controller 120 may generate enable signal 136 that indicates to primary controller 118 that primary controller 118 should turn on power switch 122. In response to such an enable signal 136, primary controller 118 may turn on power switch 122 in order to increase output voltage $V_{OUT}$ 108 towards the regulated output voltage value. If output voltage $V_{OUT}$ 108 is greater than, or equal to, the desired regulated output voltage value, then secondary controller 120 may generate an enable signal 136 that indicates to primary controller 118 that primary controller should turn off power switch 122. In response to such an enable signal 136, primary controller 118 may turn off power switch 122 to maintain output voltage $V_{OUT}$ 108.

In one example, secondary controller 120 controls operation of synchronous rectification circuit 132 using SR terminal 128-5 that is connected to the gate of the MOSFET switch of synchronous rectification circuit 132 via package terminal SR 126-5. In one example, secondary controller 120 controls synchronous rectification circuit 132 by generating a control voltage at SR terminal 128-5 that controls the MOSFET switch of synchronous rectification circuit 132. As described above, in some examples, synchronous rectification circuit 132 may be replaced by a passive rectification circuit. In these examples, SR terminal 128-5 may be removed from secondary controller 120.

Bypass capacitor 130 is coupled to bypass terminal BP 128-6 and ground terminal GND 128-7 of secondary controller 120. Bypass capacitor 130 is coupled to supply power to internal circuitry of secondary controller 120. For example, bypass capacitor 130 is coupled to bypass terminal BP 128-6 to supply power to circuits of secondary controller 120 that control synchronous rectification circuit 132, generation of enable signal 136 in response to feedback voltage $V_{FB}$ 148, and other functions within secondary controller 120 described hereinafter.

The voltage developed across bypass capacitor 130 is referred to herein as a bypass voltage $V_{BP}$ 134. Secondary controller 120 includes circuits that regulate bypass voltage $V_{BP}$ 134 in order to maintain bypass voltage $V_{BP}$ 134 at a bypass regulation voltage value $V_{BPREG}$. In some examples described herein, bypass regulation voltage value $V_{BPREG}$ may be approximately 4.4 V. Bypass regulation voltage value $V_{BPREG}$ may be set at a voltage value that is greater than a minimum value of bypass voltage $V_{BP}$ 134 that is sufficient to operate circuits of secondary controller 120. In some examples, the minimum value of bypass voltage $V_{BP}$ 134 that is sufficient to operate circuits of secondary controller 120 may be approximately 3.9 V.

Secondary controller 120 includes a charge transfer circuit 152, a charging control circuit 154, and a secondary switching circuit 156. Secondary switching circuit 156 is coupled to provide a variety of functions for secondary controller 120. For example, secondary switching circuit 156 may control synchronous rectification circuit 132 and generation of enable signal 136 in response to feedback voltage $V_{FB}$ 148.

Some connections and components within secondary controller 120 have been omitted from FIG. 1. For example, secondary switching circuit 156 may receive feedback voltage $V_{FB}$ 148 and generate enable signal 136 in response to feedback voltage $V_{FB}$ 148. Additionally, secondary switching circuit 156 may be coupled to SR terminal 128-5 to control synchronous rectification circuit 132. In some examples, secondary controller 120 may include circuits that charge bypass capacitor 130 from forward terminal FWD 128-4, e.g., during startup. Forward terminal FWD 128-4 may also be coupled to secondary switching circuit 156 in order to provide power to secondary switching circuit 156 in some examples.

Secondary controller 120 is coupled to charge bypass capacitor 130 from output voltage terminal $V_{OUT}$ 128-8 via charge transfer circuit 152. In FIG. 1, output voltage terminal $V_{OUT}$ 128-8 is coupled to output terminal 104-1 of power converter 100, which supplies regulated output voltage $V_{OUT}$ 108. Accordingly, example secondary controller 120 of FIG. 1 is coupled to charge bypass capacitor 130 from node 104-1 of the secondary side of power converter 100. Although output voltage terminal $V_{OUT}$ 128-8 is connected to node 104-1 in FIG. 1, it is contemplated that output voltage terminal $V_{OUT}$ 128-8 may be connected to other nodes of power converter 100. Accordingly, it is contemplated that, in some examples, secondary controller 120 may charge bypass capacitor 130 from a node on the secondary side other than node 104-1.

Charge transfer circuit 152 is coupled to transfer charge from output voltage terminal $V_{OUT}$ 128-8 to bypass terminal BP 128-6 for charging bypass capacitor 130. Put another way, charge transfer circuit 152 may be a circuit through which charge is transferred from output voltage terminal $V_{OUT}$ 128-8 to bypass capacitor 130. Charge transfer circuit 152 is coupled to operate in one of an enabled state or a disabled state. Charge transfer circuit 152 may transfer charge from output voltage terminal $V_{OUT}$ 128-8 to bypass terminal BP 128-6 when charge transfer circuit 152 is enabled. Charge transfer circuit 152 may disconnect output voltage terminal $V_{OUT}$ 128-8 from bypass terminal BP 128-6 so that substantially no charge is transferred from output voltage terminal $V_{OUT}$ 128-8 to bypass terminal BP 128-6 when charge transfer circuit 152 is disabled.

Charging control circuit 154 controls the state of charge transfer circuit 152 to control the transfer of charge from output voltage terminal $V_{OUT}$ 128-8 to bypass terminal BP 128-6. Charging control circuit 154 may control (i.e., enable/disable) charge transfer circuit 152 in response to a variety of conditions. In general, charging control circuit 154 controls charge transfer circuit 152 in response to output voltage $V_{OUT}$ 108 and bypass voltage $V_{BP}$ 134. In one example, charging control circuit 154 enables charge transfer circuit 152 when the magnitude of output voltage $V_{OUT}$ 108 is sufficient to charge bypass capacitor 130 and bypass voltage $V_{BP}$ 134 is less than the bypass regulation voltage value $V_{BPREG}$. For example, charging control circuit 154 may enable charge transfer circuit 152 when output voltage $V_{OUT}$ 108 is greater than bypass voltage $V_{BP}$ 134 by a threshold voltage (referred to herein as "threshold voltage $V_{TH}$") and the bypass voltage $V_{BP}$ 134 is less than the bypass regulation voltage value $V_{BPREG}$. When charge transfer circuit 152 is enabled, bypass capacitor 130 may be charged so that bypass voltage $V_{BP}$ 134 increases to a value that is equal to or greater than bypass regulation voltage value $V_{BPREG}$.

The threshold voltage $V_{TH}$ may be selected to be an amount of voltage that is expected to be dropped across charge transfer circuit 152 when charge transfer circuit 152 is enabled. For example, the threshold voltage $V_{TH}$ may be an expected difference between output voltage $V_{OUT}$ 108 and bypass voltage $V_{BP}$ 134 when charge transfer circuit 152 is enabled to charge bypass capacitor 130. In some examples described herein, the threshold voltage $V_{TH}$ may be approximately 0.2-0.4 V. Accordingly, in some examples, when charging control circuit 154 is controlling charge transfer circuit 152 to regulate bypass voltage $V_{BP}$ 134 to the bypass regulation voltage value $V_{BPREG}$ (e.g., 4.4 V), output voltage terminal $V_{OUT}$ 128-8 may become able to sufficiently charge bypass capacitor 130 when output voltage $V_{OUT}$ 108 has reached a value of the bypass regulation voltage value $V_{BPREG}$ plus the threshold voltage $V_{TH}$ (e.g., 4.6-4.8 V or greater).

Charging control circuit 154 may disable charge transfer circuit 152 when bypass voltage $V_{BP}$ 134 is greater than or equal to the bypass regulation voltage value $V_{BPREG}$. As an additional example, charging control circuit 154 may disable charge transfer circuit 152 when output voltage $V_{OUT}$ 108 is within a threshold voltage $V_{TH}$ of bypass voltage $V_{BP}$ 134, or less than bypass voltage $V_{BP}$ 134. As described herein, charge transfer circuit 152 may include circuit components (e.g., body diodes 272, 280) that block charge transfer between output voltage terminal $V_{OUT}$ 128-8 and bypass terminal $B_P$ 128-6.

As illustrated in FIG. 1, charging control circuit 154 is coupled to generate a first control signal $U_{S1}$ 158 and a second control signal $U_{S2}$ 160 that enable/disable charge transfer circuit 152. Details regarding generation of control signals $U_{S1}$ 158 and $U_{S2}$ 160 by charging control circuit 154, and the response of charge transfer circuit 152 to control signals $U_{S1}$ 158 and $U_{S2}$ 160 are described hereinafter in greater detail with respect to FIGS. 2-3.

Operation of circuits included in secondary controller 120 are now described in greater detail with respect to FIGS. 2-6. FIG. 2 shows an example charge transfer circuit 252 coupled to charging control circuit 154. Charge transfer circuit 252 is coupled to output voltage terminal VOUT 128-8 and bypass terminal BP 128-6. Although not illustrated in FIG. 2, output voltage terminal VOUT 128-8 and bypass terminal BP 128-6 may be coupled to package terminals VOUT 126-8 and BP 126-6, respectively. Accordingly, the description of charge transfer circuit 252 and charging control circuit 154 may hereinafter reference the components of power converter 100 of FIG. 1.

As described above, charging control circuit 154 may control the state of charge transfer circuit 252. For example, charging control circuit 154 may set charge transfer circuit 252 in one of an enabled state or a disabled state. In an enabled state, charge transfer circuit 252 may transfer charge from output voltage terminal VOUT 128-8 to bypass terminal BP 128-6. In a disabled state, charge transfer circuit 252 may disconnect output voltage terminal VOUT 128-8 from bypass terminal BP 128-6 so that substantially no charge is transferred from output voltage terminal VOUT 128-8 to bypass terminal BP 128-6.

Example charge transfer circuit 252 includes a first pMOS transistor 262 and a second pMOS transistor 264. First pMOS transistor 262 includes a first source terminal 266, a first drain terminal 268, a first gate terminal 270, and a first body diode 272 (labeled $D_{B1}$). Second pMOS transistor 264 includes a second drain terminal 274, a second source terminal 276, a second gate terminal 278, and a second body diode 280 (labeled $D_{B2}$).

First and second pMOS transistors 262, 264 may be coupled together as follows. First source terminal 266 is coupled to output voltage terminal VOUT 128-8. First drain terminal 268 is coupled to second drain terminal 274. Second source terminal 276 is coupled to bypass terminal BP 128-6. Put another way, first and second pMOS transistors 262, 264 of FIG. 2 are coupled in series between bypass terminal BP 128-6 and output voltage terminal VOUT 128-8 such that charge may be transferred from output voltage terminal VOUT 128-8 to bypass terminal BP 128-6 through first and second pMOS transistors 262, 264 when first and second pMOS transistors 262, 264 are each in the ON state.

First body diode 272 is coupled between first source terminal 266 and first drain terminal 268. Cathode 282 of first body diode 272 is coupled to first source terminal 266. Anode 284 of first body diode 272 is coupled to first drain terminal 268. Second body diode 280 is coupled between second drain terminal 274 and second source terminal 276. Cathode 286 of second body diode 280 is coupled to second source terminal 276 and anode 288 of second body diode 280 is coupled to second drain terminal 274.

Charging control circuit 154 is coupled to control the state of first and second pMOS transistors 262, 264 to control the state of charge transfer circuit 252. Charging control circuit 154 may set both first and second pMOS transistors 262, 264 in the ON state to enable charge transfer circuit 252 to charge bypass capacitor 130. Charging control circuit 154 may set one or both of first and second pMOS transistors 262, 264 in the OFF state to disable charge transfer circuit 252 so that substantially no charge is transferred from output voltage terminal VOUT 128-8 to bypass terminal BP 128-6.

Charging control circuit 154 is coupled to first gate terminal 270 and second gate terminal 278. Charging control circuit 154 generates first control signal $U_{S1}$ 158 that controls the state of first pMOS transistor 262. Charging control circuit 154 generates second control signal $U_{S2}$ 160 that controls the state of second pMOS transistor 264. First control signal $U_{S1}$ 158 and second control signal $U_{S2}$ 160 may be digital control signals (e.g., digital voltage values) that are received by first gate terminal 270 and second gate terminal 278, respectively. Accordingly, charging control circuit 154 may generate gate voltages at first and second gate terminals 270, 278 that control the state of first and second pMOS transistors 262, 264.

Charging control circuit 154 may generate a logic high or a logic low $U_{S1}$ 158. Similarly, charging control circuit 154 may generate a logic high or a logic low $U_{S2}$ 160. Charging control circuit 154 may generate a logic low $U_{S1}$ 158 and a logic low $U_{S2}$ 160 to set first and second pMOS transistors 262, 264 in the ON state to charge bypass capacitor 130. Charging control circuit 154 may generate a logic high $U_{S1}$ 158 and/or a logic high $U_{S2}$ 160 to disable charging of bypass capacitor 130.

Charging control circuit 154 is coupled to bypass terminal BP 128-6 and output voltage terminal VOUT 128-8 to sense bypass voltage $V_{BP}$ 134 and output voltage $V_{OUT}$ 108. Charging control circuit 154 may control the states of first and second pMOS transistors 262, 264 in response to bypass voltage $V_{BP}$ 134 and output voltage $V_{OUT}$ 108. For example, charging control circuit 154 may sense bypass voltage $V_{BP}$ 134 and output voltage $V_{OUT}$ 108 and generate control signals $U_{S1}$ 158 and $U_{S2}$ 160 in response to the sensed bypass voltage $V_{BP}$ 134 and the sensed output voltage $V_{OUT}$ 108.

With respect to control signal $U_{S2}$ 160, charging control circuit 154 senses output voltage $V_{OUT}$ 108 and bypass voltage $V_{BP}$ 134 and generates control signal $U_{S2}$ 160 in response to the magnitude of output voltage $V_{OUT}$ 108 relative to the magnitude of bypass voltage $V_{BP}$ 134. Charging control circuit 154 may generate a logic low $U_{S2}$ 160 to set second pMOS transistor 264 in the ON state when output voltage $V_{OUT}$ 108 is at a sufficient level to charge bypass capacitor 130. For example, charging control circuit 154 may generate a logic low $U_{S2}$ 160 when output voltage $V_{OUT}$ 108 is greater than bypass voltage $V_{BP}$ 134 by threshold voltage $V_{TH}$. Charging control circuit 154 may generate a logic high $U_{S2}$ 160 to set second pMOS transistor 264 in the OFF state when output voltage $V_{OUT}$ 108 is less than the sum of bypass voltage $V_{BP}$ 134 and threshold voltage $V_{TH}$. Second body diode 280 may block the transfer of charge from bypass capacitor 130 to output voltage terminal VOUT 128-8 when second pMOS transistor 264 is in the OFF state. Put another way, second body diode 280 may be oriented to block the conduction of current from bypass terminal BP 128-6 to output voltage terminal VOUT 128-8 when second pMOS transistor 264 is in the OFF state.

With respect to control signal $U_{S1}$ 158, charging control circuit 154 senses $V_{BP}$ 134 and generates control signal $U_{S1}$ 158 in response to the value of bypass voltage $V_{BP}$ 134 relative to the bypass regulation voltage value $V_{BPREG}$. Charging control circuit 154 may generate a logic low $U_{S1}$ 158 to set first pMOS transistor 262 in the ON state when bypass voltage $V_{BP}$ 134 is less than the bypass regulation voltage value $V_{BPREG}$. Charging control circuit 154 may generate a logic high $U_{S1}$ 158 to set first pMOS transistor 262 in the OFF state when bypass voltage $V_{BP}$ 134 is greater than or equal to the bypass regulation voltage value $V_{BPREG}$. First body diode 272 may be oriented to block the transfer of charge from output voltage terminal VOUT 128-8 to bypass capacitor 130 when first pMOS transistor 262 is in the OFF state. Put another way, first body diode 272 may be oriented to block the conduction of current from output voltage terminal VOUT 128-8 to bypass terminal BP 128-6 when first pMOS transistor 262 is in the OFF state.

In summary, charging control circuit 154 may set both first and second pMOS transistors 262, 264 in the ON state to charge bypass capacitor 130 when output voltage $V_{OUT}$ 108 is at a sufficient level to charge bypass capacitor 130 and when bypass voltage $V_{BP}$ 134 is less than the bypass regulation voltage value $V_{BPREG}$. Otherwise, charging control circuit 154 may set at least one of first and second pMOS transistors 262, 264 in the OFF state to disable charging of bypass capacitor 130. For example, charging control circuit 154 may disable charging of bypass capacitor 130 when output voltage $V_{OUT}$ 108 is insufficient to charge bypass capacitor 130 and/or when bypass voltage $V_{BP}$ 134 is greater than or equal to the bypass regulation voltage value $V_{BPREG}$.

FIG. 3 shows a functional block diagram of an example charging control circuit 354. Charging control circuit 354 includes an output voltage compare circuit 390 and a bypass voltage compare circuit 391. Charging control circuit 354 receives output voltage $V_{OUT}$ 108 and bypass voltage $V_{BP}$ 134. Charging control circuit 354 outputs digital control signals $U_{S1}$ 158 and $U_{S2}$ 160 that control the states of first and second pMOS transistors 262, 264, respectively.

Bypass voltage compare circuit 391 receives bypass voltage $V_{BP}$ 134 and outputs control signal $U_{S1}$ 158 that indicates the magnitude of bypass voltage $V_{BP}$ 134 relative to the bypass regulation voltage value $V_{BPREG}$. If bypass voltage $V_{BP}$ 134 is less than the bypass regulation voltage value $V_{BPREG}$, comparator 392 outputs a logic low $U_{S1}$ 158 that sets first pMOS transistor 262 in the ON state. If bypass voltage $V_{BP}$ 134 is greater than the bypass regulation voltage value $V_{BPREG}$, comparator 392 outputs a logic high $U_{S1}$ 158 that sets first pMOS transistor 262 in the OFF state.

Output voltage compare circuit 390 receives output voltage $V_{OUT}$ 108 and bypass voltage $V_{BP}$ 134 and outputs control signal $U_{S2}$ 160 that indicates whether output voltage $V_{OUT}$ 108 is at a sufficient level to charge bypass capacitor 130. If output voltage $V_{OUT}$ 108 is less than the sum of bypass voltage $V_{BP}$ 134 and the threshold voltage $V_{TH}$, comparator 393 outputs a logic high $U_{S2}$ 160 that sets second pMOS transistor 264 in the OFF state. If output voltage $V_{OUT}$ 108 is greater than the sum of bypass voltage $V_{BP}$ 134 and threshold voltage $V_{TH}$, comparator 393 outputs a logic low $U_{S2}$ 160 that sets second pMOS transistor 264 in the ON state.

FIGS. 4A-4D illustrate the states of first and second pMOS transistors 262, 264 in different scenarios. In FIGS. 4A-4D, the ON and OFF states are illustrated as closed and open switches, respectively. FIGS. 4A-4B show first and second pMOS transistors 262, 264 in scenarios when output voltage $V_{OUT}$ 108 is sufficient to charge bypass capacitor 130. In general, during operation of power converter 100, output voltage $V_{OUT}$ 108 may be maintained at a regulated output voltage value that is sufficient to charge bypass capacitor 130. However, in some scenarios, output voltage $V_{OUT}$ 108 may drop to a level that is insufficient for charging bypass capacitor 130, e.g., due to excessive loading at output terminals 104. FIGS. 4C-4D show first and second pMOS transistors 262, 264 in scenarios when output voltage $V_{OUT}$ 108 has dropped to a level that is insufficient to charge bypass capacitor 130. FIGS. 4A-4D are now described in turn.

FIG. 4A shows first and second pMOS transistors 262, 264 in a scenario in which output voltage $V_{OUT}$ 108 is sufficient to charge bypass capacitor 130 and bypass voltage $V_{BP}$ 134 is already at a value that is greater than or equal to the bypass regulation voltage value $V_{BPREG}$. Put another way, in FIG. 4A, bypass voltage $V_{BP}$ 134 is greater than the bypass regulation voltage value $V_{BPREG}$ and output voltage $V_{OUT}$ 108 greater than the sum of bypass voltage $V_{BP}$ 134 and threshold voltage $V_{TH}$. Accordingly, second pMOS transistor 264 is in the ON state (e.g., a closed switch) and first pMOS transistor 262 is in the OFF state (e.g., an open switch). In this scenario, second pMOS transistor 264 may act as a closed switch that may transfer charge. However, first pMOS transistor 262 may act as an open switch that blocks the transfer of charge. First body diode 272 is oriented in a direction that blocks the transfer of charge from output voltage terminal VOUT 128-8 to bypass terminal BP 128-6. Put another way, first body diode 272 is oriented to prevent the conduction of current from output voltage terminal VOUT 128-8 towards bypass terminal BP 128-6.

FIG. 4B shows first and second pMOS transistors 262, 264 in a scenario in which output voltage $V_{OUT}$ 108 is sufficient to charge bypass capacitor 130 and bypass voltage $V_{BP}$ 134 is less than the bypass regulation voltage value $V_{BPREG}$. Put another way, in FIG. 4B, bypass voltage $V_{BP}$ 134 is less than the bypass regulation voltage value $V_{BPREG}$ and output voltage $V_{OUT}$ 108 is greater than the sum of bypass voltage $V_{BP}$ 134 and threshold voltage $V_{TH}$. Accordingly, both first and second pMOS transistors 262, 264 are in the ON state. In this scenario, first and second pMOS transistors 262, 264 may act as closed switches that transfer charge (i.e., conduct current) from output voltage terminal VOUT 128-8 to bypass terminal BP 128-6 to charge bypass capacitor 130 towards the bypass regulation voltage value $V_{BPREG}$.

The voltage drop across each of first and second pMOS transistors 262, 264 may be approximately 0.1-0.2 V, depending on fabrication process variations and temperature variations of first and second pMOS transistors 262, 264 during operation. For example, the voltage drop between first source terminal 266 and first drain terminal 268 may be approximately 0.1-0.2 V when first pMOS transistor 262 is in the ON state. Similarly, the voltage drop between second drain terminal 274 and second source terminal 276 may be approximately 0.1-0.2 V when second pMOS transistor 264 is in the ON state. Accordingly, a total voltage drop across the series connection of first and second pMOS transistors 262, 264 may be approximately 0.2-0.4 V when first and second pMOS transistors 262, 264 are both in the ON state. Put another way, the total voltage drop between first source terminal 266 and second source terminal 276 (e.g., $V_{OUT}$ 108 minus $V_{BP}$ 134) may be approximately 0.2-0.4 V when both first and second pMOS transistors 262, 264 are in the ON state.

Output voltage $V_{OUT}$ 108 may be regulated at a value of approximately 5-12 V, depending on the configuration of power converter 100. The low voltage drop of 0.2-0.4 V between output voltage terminal VOUT 128-8 and bypass terminal BP 128-6 may allow bypass capacitor 130 to be charged to a bypass voltage $V_{BP}$ within 0.2-0.4 V of output voltage $V_{OUT}$ 108. In examples where output voltage $V_{OUT}$ 108 is regulated at approximately 5 V (e.g., within a range of 4.8-5.1 V), bypass voltage $V_{BP}$ 134 may be reliably regulated at approximately 4.4 V since charge transfer circuit 252 may drop approximately 0.2-0.4 V during operation.

FIG. 4C shows first and second pMOS transistors 262, 264 in a scenario in which output voltage $V_{OUT}$ 108 is insufficient to charge bypass capacitor 130 and bypass voltage $V_{BP}$ 134 is at a value that is greater than or equal to bypass regulation voltage value $V_{BPREG}$. Put another way, in FIG. 4C, bypass voltage $V_{BP}$ 134 is greater than or equal to the bypass regulation voltage value $V_{BPREG}$ and output voltage $V_{OUT}$ 108 is less than the sum of bypass voltage $V_{BP}$ 134 and threshold voltage $V_{TH}$. Accordingly, both first and second pMOS transistors 262, 264 are in the OFF state. In this scenario, first and second pMOS transistors 262, 264 may act as open switches that block charge transfer between output voltage terminal VOUT 128-8 to bypass terminal BP 128-6. As described herein, first and second body diodes 272, 280 are oriented to block the transfer of charge (i.e., conduction of current) between bypass terminal BP 128-6 and output voltage terminal VOUT 128-8.

FIG. 4D shows first and second pMOS transistors 262, 264 in a scenario in which output voltage $V_{OUT}$ 108 is insufficient to charge bypass capacitor 130 and bypass voltage $V_{BP}$ 134 is less than the bypass regulation voltage value $V_{BPREG}$. Put another way, in FIG. 4D, bypass voltage $V_{BP}$ 134 is less than the bypass regulation voltage value $V_{BPREG}$ and output voltage $V_{OUT}$ 108 is less than the sum of bypass voltage $V_{BP}$ 134 and threshold voltage $V_{TH}$. Accordingly, first pMOS transistor 262 is in the ON state and second pMOS transistor 264 is in the OFF state. In this scenario, first pMOS transistor 262 acts as a closed switch and second pMOS transistor 264 acts as an open switch. Second body diode 280 is oriented in a direction that blocks charge transfer (i.e., current conduction) from bypass terminal BP 128-6 to output voltage terminal VOUT 128-8 in the event that output voltage $V_{OUT}$ 108 has dropped to a level that could discharge bypass capacitor 130 via first pMOS transistor 262. Although a diode external to a pMOS transistor could be used to prevent discharging of bypass capacitor 130 in some circuit implementations, the use of such a diode may present a forward voltage drop that may be greater than that provided by the series pMOS transistor configuration of charge transfer circuit 252 described herein.

As described above, during typical operation of power converter 100, output voltage $V_{OUT}$ 108 may be maintained at a regulated output voltage value that is sufficient to charge bypass capacitor 130. Accordingly, during typical operation, charging control circuit 154 may set the second pMOS transistor 264 in the ON state and toggle the state of first pMOS transistor 262 depending on the value of bypass voltage $V_{BP}$ 134 relative to the bypass regulation voltage value $V_{BPREG}$. However, in a scenario where output voltage $V_{OUT}$ 108 drops to a level that is insufficient for charging bypass capacitor 130 (e.g., due to excessive loading), charging control circuit 154 may set second pMOS transistor 264 in the OFF state as illustrated in FIGS. 4C-4D. In this scenario, output voltage $V_{OUT}$ 108 may return to a level that is sufficient for charging bypass capacitor 130 after a period of time. After output voltage $V_{OUT}$ 108 returns to a level that is sufficient for charging bypass capacitor 130, charging control circuit 154 may return to controlling first and second pMOS transistors 262, 264 as illustrated in FIGS. 4A-4B.

FIG. 5 shows an example method 500 for controlling an isolated power converter according to the present disclosure. In block 502, output voltage $V_{OUT}$ 108 has reached a value that is greater than the sum of bypass voltage $V_{BP}$ 134 and threshold voltage $V_{TH}$. In block 504, charging control circuit 154 sets second pMOS transistor 264 into the ON state.

In block 506, charging control circuit 154 determines whether bypass voltage $V_{BP}$ 134 is less than bypass regulation voltage value $V_{BPREG}$. If bypass voltage $V_{BP}$ 134 is less than bypass regulation voltage value $V_{BPREG}$, charging control circuit 154 sets first pMOS transistor 262 into the ON state in block 508 to charge bypass capacitor 130. If bypass voltage $V_{BP}$ 134 is greater than or equal to bypass regulation voltage value $V_{BPREG}$, charging control circuit 154 sets first pMOS transistor 262 into the OFF state in block 510 to prevent charging of bypass capacitor 130.

In block 512, charging control circuit 154 determines whether output voltage $V_{OUT}$ 108 is at a sufficient level to charge bypass capacitor 130. If output voltage $V_{OUT}$ 108 is greater than bypass voltage $V_{BP}$ 134 by the threshold voltage $V_{TH}$, method 500 continues in block 504 where charging control circuit 154 sets, or maintains, second pMOS transistor 264 in the ON state. If output voltage $V_{OUT}$ 108 is not greater than the sum of bypass voltage $V_{BP}$ 134 and threshold voltage $V_{TH}$, charging control circuit 154 sets second pMOS transistor 264 into the OFF state in block 514 to prevent charging/ discharging of bypass capacitor 130.

FIG. 6 shows an example integrated circuit package 624 that includes a magnetically coupled communication link. Integrated circuit package 624 includes a power switch 622 (e.g., power MOSFET 622), an example primary controller 618, and an example secondary controller 620. Power switch 622, primary controller 618, and secondary controller 620 may have similar functionality as power switch 122, primary controller 118, and secondary controller 120 described above.

Circuits external to integrated circuit package 624 may electrically couple to package terminals D 626-1, S 626-2, PBP 626-3, FWD 626-4, SR 626-5, BP 626-6, GND 626-7, VOUT 626-8, and FB 626-9 (collectively "package terminals 626") of integrated circuit package 624. Package terminals 626 may connect to terminals (e.g., on integrated circuit dice) of power switch 622, primary controller 618, and secondary controller 620 included on the inside of integrated circuit package 624. Terminals inside of integrated circuit package 624 may include terminals D 628-1, S 628-2, PBP 628-3, FWD 628-4, SR 628-5, BP 628-6, GND 628-7, VOUT 628-8, and FB 628-9 (collectively "terminals 628"). Terminals 628 may be conductive connections included on the integrated circuit dice included in integrated circuit package 624. Package terminals 626 may be connected to a power converter in a similar manner as illustrated in FIG. 1. Accordingly, the description of integrated circuit package 624 may hereinafter reference the components of power converter 100 of FIG. 1.

Secondary controller 620 includes a charge transfer circuit 652 and a charging control circuit 654. Charge transfer circuit 652 may operate in a similar manner as charge transfer circuits 152, 252 described above. Charging control circuit 654 may operate in a similar manner as charging control circuits 154, 354 described above.

Secondary controller 620 includes a forward power circuit 694. In some examples, forward power circuit 694 may charge bypass capacitor 130 from forward terminal FWD 628-4, e.g., during startup. Forward terminal FWD 628-4 may also be coupled to secondary switching circuit 656 in order to provide power to secondary switching circuit 656 in some examples.

Secondary switching circuit 656 may operate in a similar manner as secondary switching circuit 156 described above. For example, secondary switching circuit 656 may be coupled to terminal SR 628-5 to control synchronous rectification circuit 132. Secondary switching circuit 656 may also receive feedback signal $U_{FB}$ 648 and generate enable signal $U_{EN}$ 636 in response to feedback signal $U_{FB}$ 648.

Integrated circuit package 624 includes a primary conductive loop 695, a secondary conductive loop 696, a driver transistor 697, and a communication control circuit 698 that may implement a magnetically coupled communication link. Primary conductive loop 695 and secondary conductive loop 696 may be isolated conductors of the lead frame of integrated circuit package 624. In other words, primary and secondary conductive loops 695, 696 may be included in the lead frame of integrated circuit package 624. By integrating primary and secondary conductive loops 695, 696 in the lead frame of integrated circuit package 624, the communication link between the primary and secondary sides of power converter 100 may be added to integrated circuit package 624 with less cost.

Primary conductive loop 695 may be coupled to primary controller 618 on the primary side of power converter 100. Secondary conductive loop 696 may be coupled to secondary controller 620 on the secondary side of power converter 100. Accordingly, primary conductive loop 695 and secondary conductive loop 696 may be galvanically isolated from one another.

Although primary and secondary conductive loops 695, 696 are galvanically isolated from one another, primary and secondary conductive loops 695, 696 may be magnetically coupled such that a current through secondary conductive loop 696 may induce a voltage/current in primary conductive loop 695. As described hereinafter, secondary controller 620 may communicate with primary controller 618 by generating a current through secondary conductive loop 696 that induces a voltage/current in primary conductive loop 695. For example, secondary controller 620 may transmit enable signal $U_{EN}$ 636 to primary controller 618 via secondary and primary conductive loops 696, 695.

In general, secondary switching circuit 656 may be coupled to transmit enable signal $U_{EN}$ 636 to primary controller 618 via primary and secondary conductive loops 695, 696 to regulate output voltage $V_{OUT}$ 108 at a regulated output voltage value. Secondary switching circuit 656 may generate enable signal $U_{EN}$ 636 in response to a sensed feedback signal $U_{FB}$ 648. Feedback signal $U_{FB}$ 648 may be representative of an output parameter (e.g., voltage and/or current) of power converter 100. In one example, feedback signal $U_{FB}$ 648 is a feedback voltage.

Primary controller 618 is coupled to receive enable signal $U_{EN}$ 636 via primary conductive loop 695. Primary controller 618 is coupled to control power switch 622 in response to enable signal $U_{EN}$ 636 to regulate output voltage $V_{OUT}$ 108. For example, primary controller 618 may detect the voltage/current induced in primary conductive loop 695 and generate drive signal $U_{DRIVE}$ 638 in response to the detected voltage/current. Drive signal $U_{DRIVE}$ 638 controls the state of power switch 622 to control current through power switch 622.

FIG. 6 illustrates components of secondary switching circuit 656 that generate enable signal $U_{EN}$ 636 via secondary conductive loop 696. For example, secondary switching circuit 656 includes a communication control circuit 698 and driver transistor 697 that operate to control current through secondary conductive loop 696 to generate enable signal $U_{EN}$ 636. Communication control circuit 698 may control driver transistor 697 to drive current through secondary conductive loop 696 to induce a voltage/current in primary conductive loop 695. For example, communication control circuit 698 may control driver transistor 697 to generate enable signal $U_{EN}$ 636 in response to a sensed feedback signal $U_{FB}$ 648.

Communication control circuit 698 may control the state of driver transistor 697 by controlling the gate voltage of driver transistor 697. For example, communication control circuit 698 may generate a logic high gate voltage to set driver transistor 697 into an ON state (e.g., a closed switch) to drive current through secondary conductive loop 696. Communication control circuit 698 may generate a logic low gate voltage to set driver transistor 697 into an OFF state (e.g., an open switch) to cut off current through secondary conductive loop 696.

As illustrated in FIG. 6, drive transistor 697 and communication control circuit 698 may be coupled to bypass terminal BP 628-6 to receive bypass voltage $V_{BP}$ 134. When driver transistor 697 is in the ON state, driver transistor 697 may act as a closed switch that conducts current. The amount of current conducted through driver transistor 697 when driver transistor 697 is in the ON state may depend on the gate voltage generated by communication control circuit 698. In general, an increase in the gate voltage applied to driver transistor 697 may result in an increase in the amount of current conducted through driver transistor 697 and secondary conductive loop 696. In turn, an increase in the amount of current through secondary conductive loop 696 may result in a stronger transmission of enable signal $U_{EN}$ 636 to primary conductive loop 695.

As described above, charge transfer circuit 652 may allow bypass voltage $V_{BP}$ to be charged to a value that is near (e.g., within 0.2-0.4 V) output voltage $V_{OUT}$ 108. Communication control circuit 698, which receives bypass voltage $V_{BP}$ 134, may generate a gate voltage having a similar magnitude as bypass voltage $V_{BP}$ 134. For example, communication control circuit 698 may generate a gate voltage within 0.2-0.4 V of output voltage $V_{OUT}$ 108 in some examples. In scenarios where bypass voltage $V_{BP}$ 134 may be charged to approximately 4.4 V, communication control circuit 698 generate a gate voltage of approximately 4.4 V at the gate of driver transistor 697.

Since the magnitude of the gate voltage applied to driver transistor 697 may control the amount of current through driver transistor 697 in the ON state, the high gate voltage generated by communication control circuit 698 may generate a relatively large current through secondary conductive loop 696. The relatively large current through secondary conductive loop 696 may induce a voltage/current in primary conductive loop 695 that may be reliably detected by primary conductive controller 618. Accordingly, the relatively high bypass voltage $V_{BP}$ 134 that may be achieved using charge transfer circuit 652 of the present disclosure may be used to provide a more reliable magnetically coupled communication link.

The above description of illustrated examples of the present invention, including what is described in the Abstract, are not intended to be exhaustive or to be limiting to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, times, etc., are provided for explanation purposes and that other values may also be employed in other embodiments and examples in accordance with the teachings of the present disclosure.

What is claimed is:

1. An integrated circuit package comprising:
   a secondary controller comprising:
      a first controller terminal to be coupled to a first node of a secondary side of an isolated power converter;
      a second controller terminal to be coupled to a second node of the secondary side;
      a first p-channel metal-oxide-semiconductor field-effect transistor (pMOS transistor) including a first body diode;
      a second pMOS transistor including a second body diode, wherein the first and second pMOS transistors are coupled in series between the first controller terminal and the second controller terminal to conduct current from the second controller terminal to the first controller terminal when both of the first and second pMOS transistors are in an ON state, and wherein the second body diode is oriented to block current conduction from the first controller terminal to the second controller terminal when the second pMOS transistor is in an OFF state; and
      a secondary switching circuit coupled to transmit a signal to a primary side of the isolated power converter;
   a primary controller coupled to receive the transmitted signal and control a power switch in response to the transmitted signal; and
   an encapsulation, wherein the primary controller and the secondary controller are disposed within the encapsulation.

2. The integrated circuit package of claim 1, wherein the first body diode is oriented to block current conduction from the second controller terminal to the first controller terminal when the first pMOS transistor is in the OFF state.

3. The integrated circuit package of claim 1, wherein the primary controller and the secondary controller are galvanically isolated from one another.

4. The integrated circuit package of claim 1, further comprising the power switch, wherein the power switch is disposed within the encapsulation.

5. The integrated circuit package of claim 1, further comprising a lead frame, wherein the secondary switching circuit is coupled to transmit the signal to the primary controller via the lead frame.

6. The integrated circuit package of claim 5, wherein the lead frame comprises a primary conductive loop and a secondary conductive loop that are galvanically isolated from one another, wherein the primary conductive loop is coupled to the primary controller, wherein the secondary conductive loop is coupled to the secondary switching circuit, wherein the secondary switching circuit is coupled to transmit the signal via the secondary conductive loop, and wherein the primary controller is coupled to receive the transmitted signal via the primary conductive loop.

7. A power converter comprising:
   an energy transfer element comprising a primary winding on a primary side of the power converter and a secondary winding on a secondary side of the power converter;
   a bypass capacitor coupled to the secondary side of the power converter;
   a power switch coupled to the primary winding;
   a secondary controller comprising:
      a first p-channel metal-oxide-semiconductor field-effect transistor (pMOS transistor) including a first body diode;
      a second pMOS transistor including a second body diode, wherein the first and second pMOS transistors are coupled in series between an output node of the secondary side and the bypass capacitor to transfer charge from the output node to the bypass capacitor when both of the first and second pMOS transistors are in an ON state, and wherein the second body diode is oriented to block current conduction from the bypass capacitor to the output node when the second pMOS transistor is in an OFF state; and
      a secondary switching circuit coupled to transmit a signal to the primary side of the isolated power converter; and
   a primary controller coupled to receive the transmitted signal and control a state of the power switch in response to the transmitted signal.

8. The power converter of claim 7, wherein the first body diode is oriented to block current conduction from the output node to the bypass capacitor when the first pMOS transistor is in the OFF state.

9. The power converter of claim 7, wherein the output node of the secondary side is an output node of the power converter coupled to deliver a regulated output voltage.

* * * * *